US012744195B2

(12) United States Patent
Salmi et al.

(10) Patent No.: US 12,744,195 B2
(45) Date of Patent: Sep. 22, 2026

(54) SYSTEM AND METHOD FOR SAMPLING

(71) Applicant: HELSINGIN YLIOPISTO, Helsingin yliopisto (FI)

(72) Inventors: Ari Salmi, Helsinki (FI); Axi Holmström, Helsingin yliopisto (FI); Joni Mäkinen, Helsingin yliopisto (FI); Petri Lassila, Helsingin yliopisto (FI); Jere Hyvönen, Helsingin yliopisto (FI); Tom Sillanpää, Helsingin yliopisto (FI); Tapio Kotiaho, Helsingin yliopisto (FI); Antti Kuronen, Helsingin yliopisto (FI); Edward Haeggström, Helsinki (FI)

(73) Assignee: HELSINGIN YLIOPISTO, Helsingin Yliopisto (FI)

( * ) Notice: Subject to any disclaimer, the term of this patent is extended or adjusted under 35 U.S.C. 154(b) by 351 days.

(21) Appl. No.: 18/571,630

(22) PCT Filed: Jun. 27, 2022

(86) PCT No.: PCT/FI2022/050470
§ 371 (c)(1),
(2) Date: Dec. 18, 2023

(87) PCT Pub. No.: WO2023/281159
PCT Pub. Date: Jan. 12, 2023

(65) Prior Publication Data

US 2024/0290599 A1 Aug. 29, 2024

(30) Foreign Application Priority Data

Jul. 6, 2021 (FI) ..................................... 20215787

(51) Int. Cl.
*H05G 2/00* (2006.01)
*H01J 49/04* (2006.01)
*H01J 49/16* (2006.01)

(52) U.S. Cl.
CPC ........ *H01J 49/0459* (2013.01); *H01J 49/165* (2013.01); *H01J 49/0468* (2013.01)

(58) Field of Classification Search
CPC ........ H01J 49/00; H01J 49/02; H01J 49/0459; H01J 49/165; H01J 49/0468; H01J 49/0454

(Continued)

(56) References Cited

U.S. PATENT DOCUMENTS 5,526,110 A * 6/1996 Braymen ............ H01J 49/0009 250/252.1
2002/0109084 A1* 8/2002 Ellson ................ H01J 49/0454 250/288

(Continued)

FOREIGN PATENT DOCUMENTS

EP 1125121 A1 8/2001
EP 3258480 A1 12/2017

(Continued)

OTHER PUBLICATIONS

Search Report for FI Application No. 20215787 dated Feb. 1, 2022, 1 page.

(Continued)

*Primary Examiner* — Jason L McCormack
(74) *Attorney, Agent, or Firm* — NIXON & VANDERHYE

(57) ABSTRACT

This relates to sampling systems, wherein the sampling is based on removal of material from a sample immersed in a fluid by cavitation induced by high-intensity focused ultra-sound. The system includes also a feeding unit for trans- (Continued)

porting at least part of the removed material from the fluid to a detecting unit. The invention relates also to a method for feeding material from the sample to a detecting unit using the sampling system.

18 Claims, 4 Drawing Sheets

(58) Field of Classification Search
USPC ........................................ 250/281, 282, 288
See application file for complete search history.

(56) References Cited

U.S. PATENT DOCUMENTS

| | | | | |
|---|---|---|---|---|
| 2006/0158956 | A1 | 7/2006 | Laugharn et al. | |
| 2007/0053795 | A1 | 3/2007 | Laugharn et al. | |
| 2010/0301199 | A1* | 12/2010 | Chen | H01J 49/10 250/288 |
| 2013/0294971 | A1* | 11/2013 | Van Berkel | G01N 1/02 422/68.1 |
| 2014/0070094 | A1* | 3/2014 | Otsuka | H01J 49/26 250/288 |
| 2014/0283628 | A1 | 9/2014 | Hattingh et al. | |
| 2014/0319335 | A1* | 10/2014 | Morris | G01N 29/02 250/288 |
| 2019/0157061 | A1* | 5/2019 | Datwani | H01J 49/0454 |

FOREIGN PATENT DOCUMENTS

| | | | |
|---|---|---|---|
| WO | 0025125 | A1 | 5/2000 |
| WO | 2019102350 | A1 | 5/2019 |

OTHER PUBLICATIONS

International Search Report for PCT/FI2022/050470 mailed Oct. 4, 2022, 3 pages.

Written Opinion of the ISA for PCT/FI2022/050470 mailed Oct. 4, 2022, 6 pages.

* cited by examiner

SYSTEM AND METHOD FOR SAMPLING

CROSS-REFERENCE TO RELATED APPLICATIONS

This application is the U.S. national phase of International Application No. PCT/FI2022/050470 filed Jun. 27, 2022 which designated the U.S. and claims priority to FI 20215787 filed Jul. 6, 2021, the entire contents of each of which are hereby incorporated by reference.

FIELD

The present invention relates to systems and methods for sampling, in particular to systems and methods wherein the sampling is based on ultrasound assisted removal of material from the sample for feeding the material to a detecting means. The invention relates also a detecting means comprising the system.

BACKGROUND

Analysis of samples via mass spectrometry (MS) rely on desorption and ionization methods including matrix-assisted laser desorption ionization (MALDI), desorption electrospray ionization (DESI), laser ablation electrospray ionization (LAESI) and secondary ion mass spectrometry (SIMS). Each method performs at best with certain types of analytes and are used for different applications, although there is no universal ionization method that fits for all analytical purposes. Each of the method works either in ambient or in vacuum conditions but none of the current desorption methods operates well with sample immersion. Since biological samples e.g., cell cultures and tissue sections are often stored at liquid medium their mass spectrometric analysis may be laborious. Accordingly, there is still a need for further systems and methods for sampling.

SUMMARY

The present invention is based on the observation that at least some of the problems related to sampling material from samples immersed in a fluid can be avoided or at least alleviated by creating controlled focused cavitation at predetermined positions within a sample. According to the present invention cavitation created by high-intensity focused ultrasound waves (HIFU) removes material from interface between the sample and the immersion fluid. The combination of acoustic streaming and flow field induced by transport of fluid into a feeding means such as a sampling capillary close to the ultrasound focus allows capturing removed material and transporting it for further analysis.

Accordingly, it is an object of the present invention to provide a system for sampling material to a detecting means, the system comprising

- a housing for a sample and a fluid for immersing the sample,
- a transducer configured to emit focused ultrasound waves towards a target on interface between the sample and the fluid for removing material from the sample to the fluid and for producing an acoustic stream in the fluid, and
- a feeding means comprising a first end configured to be positioned between the transducer and the interface, and a second end configured to be connected to the detecting means, and fluid transport means between the first end and the second end, the feeding means configured to transport at least part of removed material to the detecting means.

It is also an object of the present invention to provide a detecting means comprising system of claim 1.

It is still an object of the present invention to provide a method for feeding material from a sample to a detecting means using the system of claim 1.

Further objects of the present invention are described in the accompanying dependent claims.

Exemplifying and non-limiting embodiments of the invention, both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of un-recited features. The features recited in the accompanied depending claims are mutually freely combinable unless otherwise explicitly stated. Furthermore, it is to be understood that the use of "a" or "an", i.e., a singular form, throughout this document does not exclude a plurality.

DESCRIPTION

Figure 1:
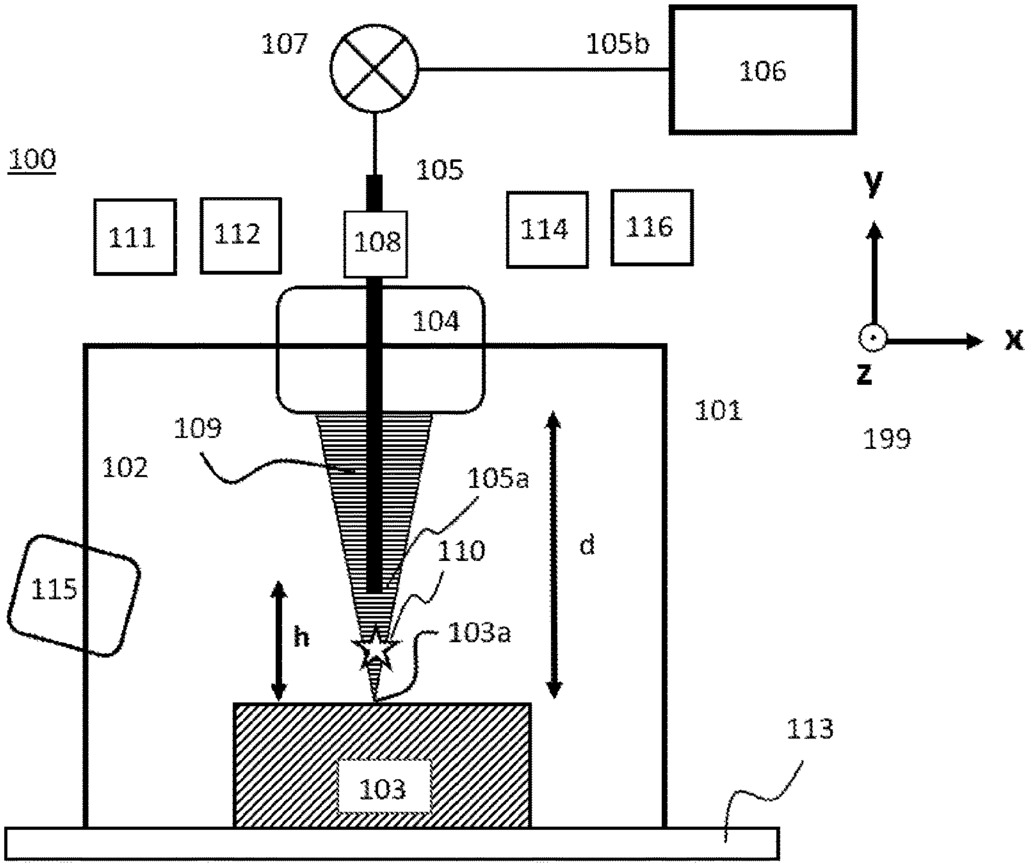
FIGS. 1 and 2 illustrate exemplary systems of the present invention.

According to one aspect the present invention concerns a sampling system for transporting material removed from a sample to a detecting means. An exemplary system 100 is shown in FIG. 1. The system comprises a housing 101 for fluid 102 and a sample 103, a transducer 104, and a feeding means 105.

The transducer is configured to emit focused ultrasound waves towards a target on interface **103*a*** between the sample and the fluid. An exemplary transducer suitable for the system is a focused piezoelectric transducer. An exemplary operating frequency is 12 MHz. The intensity of the ultrasound at the target is preferably at least 1 W/cm$^2$ to allow removing material from the sample and for producing an acoustic stream in the fluid. An acoustic stream is a steady flow in a fluid driven by the absorption of high amplitude acoustic oscillations.

The feeding means shown in the figure comprises a first end 105*a* configured to be positioned between the transducer and the interface, a second end 105*b* configured to be connected to the detecting means 106, and a fluid transporting means 107 between the first end and the second end. An exemplary fluid transporting means is a pump.

The first end should be in close proximity to the interface when the system is in operation. The distance h between the interface 103*a* and the first end 105*a* is preferably 1.5-5 mm. An exemplary distance is 2 mm. This warrants effective transportation of the material from the fluid to the detecting means. A typical first end comprises a capillary tube. If the distance is too short, the ultrasound beam is distorted by the capillary and the cavitation threshold is not exceed at the focal point. If the distance is too long, the sampling flow volume rate should be increased to effectively collect removed material. Problems might also arise due to increased sample volume i.e., sensitivity might decrease.

According to a preferable embodiment the system also comprises means 108 for adjusting the distance h between the interface 103*a* and the first end 105*a*. An exemplary means 108 comprises manual micro-meter screws.

When the system is in operation, the sample is immersed in the fluid, and the transducer emits high intensity focused ultrasound (HIFU) waves 109 towards a target on interface between the sample and the fluid. The HIFU induced cavitation erosion removes material from the sample at the target. Acoustic streaming induced by the focused ultrasound beam near acoustic hard boundary causes the removed material to move away from the interface, i.e., along the y-direction of the coordinate system 199. An exemplary removed material particle is illustrated in the figure by a star marked by a reference number 110.

The transducer needs to operate at an intensity at the focal spot which is preferably higher than 1 W/cm$^2$, more preferably 10 W/cm$^2$ or higher. The frequency of the transducer should be at least 20 kHz, preferably between 1 MHz and 15 MHz. Higher frequencies, up to 1 GHz can be used. Higher frequency provides a smaller focal spot for more localized sampling. For example, for a 12 MHz transducer with a numerical aperture of 0.85, the cavitation erosion pit radii ranges from 20 μm to 200 μm depending on the sample and ultrasound parameters. Increasing the frequency increases the cavitation pressure threshold so higher frequencies require tighter focusing and/or higher driving voltage of the piezo.

Breaking the sample cohesion, e.g., aluminum surface, requires higher acoustic pressure amplitude and higher total energy than breaking down adhesion of the sample, e.g., a thin film on a hard substrate. For aluminum in water the pressure amplitude at the focus should exceed 10 MPa, preferably higher, such as 20-25 MPa. The cavitation probability increases as the amplitude increases so higher amplitudes provide higher erosion/extraction efficiency. As the amplitude gets higher the erosion area increases as the part of the field that exceeds cavitation threshold increases. Accordingly, the spatial resolution of the method depends on the amplitude. The cavitation threshold is function of frequency i.e., the higher frequency the higher is the cavitation threshold. For breaking the adhesion, 15 MPa suffices and tuning the amplitude allows tuning the extraction area. The cycle count of the ultrasonic bursts should be preferably between 20 and 80 or more to provide high enough cavitation probability. The pulse repetition frequency (PRF) should be tuned in such a manner that the transducer does not overheat. For example, for a water-immersed 12 MHz single-element piezoceramic, maximum of 50 W-100 W of forward electric power is suitable.

The target can be of any geometric shape. A particular target is a point on the interface. Another target is a line on the interface.

According to a particular embodiment the system comprises means 111 for moving the focal point of the ultrasound waves. This can be done e.g., by moving the transducer or by moving the housing. According to an exemplary embodiment the system comprises means 112 configured to move the transducer in x,y,z-directions of the coordinate system 199 e.g., by translation stages controlled with manual micro-meter screws. This allows positioning the interface at the focal point of the ultrasound waves. According to another embodiment the transducer is a phased 25 array transducer that is configured to tune the focal distance. The focal point adjustment can be assisted by placing a hydrophone or the like in the housing.

According to another embodiment the moving of the focal point of the ultrasound waves is done by a means 113 configured to move the housing in x,y,z-directions, at least in x,z-directions of the coordinate system 199. The movement can be performed by placing the housing onto a CNC-router table operated by a microcontroller.

According to a particular embodiment the system comprises means 114, such as a computer program to assist with selecting the target based on an ultrasound image. According to an exemplary embodiment the program determines areas of the sample surface that are harder than a predetermined hardness level and instructs the means 111 to move the focal point by moving the transducer above those areas one by one. Then, the HIFU induced cavitation erosion removes material from the selected sites, and the system feeds the removed material to the detecting means for analysis. This approach may be used to find abnormalities such as cancers in biological samples. According to another preferable embodiment the means 114 is also configured to instruct the means 108 to adjust the distance h between the interface and the first end and/or to instruct moving the holding means.

According to one embodiment the image is an image imputed to the computer program. According to another embodiment the system comprises imaging means 115 such as a second transducer configured to produce the image which is then transferred to the computer program. According to another embodiment the transducer 104 is configured to produce the ultrasound image. Ultrasound imaging is well known in the art.

According to still another embodiment the system comprises means 116 for controlling properties of the fluid. Exemplary properties are pH of the fluid, temperature of the fluid, water content of a non-aqueous fluid, relative humidity of a gaseous fluid, velocity of the fluid.

According to another embodiment the present invention concerns a detecting means 106 comprising the sampling system described above. The detecting means is preferably selected from mass spectrometer, Raman spectrometer, NMR spectrometer, IR spectrometer, UV spectrophotometer, scanning electron microscope, atomic force microscope, quartz crystal balance, dynamic light scattering meter, high pressure liquid chromatograph, x-ray diffractometer, activity assay means, immunoassay means, preferably mass spectrometer, and Raman spectrometer.

According to a particular embodiment the detecting means comprises two or more spectrometers. According to an exemplary embodiment the sampling system is connected to a mass spectrometer via a Raman spectrometer.

According to a preferable embodiment the detecting means is an electrospray ionization (ESI) mass spectrometer. ESI is a versatile soft ionization method suitable for many kinds of analytes and can easily be coupled with other separation methods e.g., liquid chromatography (LC) increasing the analytical performance. Different techniques have also developed further from the basis of spraying the solvent with or without analyte at the ion source as in DESI. ESI suits also for wide range of analytes, and it generates either positive or negative polarity of ions. In comparison to other techniques like SIMS or MALDI, ESI stands for more gentle type of ionization method. Generation of unfragmented ions would be considered as an advantage in respect to MS data interpretation of complex samples such as biological samples.

Figure 2:
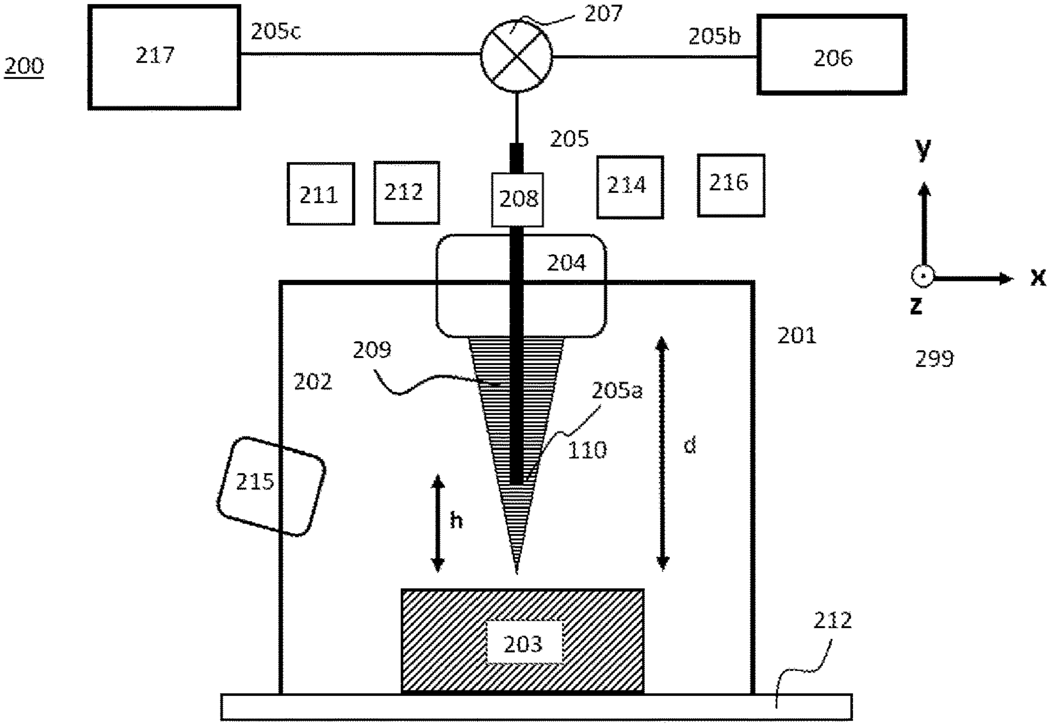

FIG. 2 shows another exemplary system 200 of the present invention. The system comprises housing 201 for a sample and a fluid for immersing the sample, a transducer 204, configured to emit focused ultrasound waves towards a target on interface between the sample and the fluid for removing material from the sample to the fluid and for producing an acoustic stream in the fluid, and a feeding means 205 comprising a first end 205*a* configured to be positioned between the transducer and the interface, a second end 205*b* configured to be connected to the detecting means and a third end connected to a collecting means 217. The fluid transport means 207 is configured to feed the fluid towards the detecting means 206 and towards the collecting means 217.

The system 200 comprises preferably also one or more of
- means 208 for adjusting distance h between the interface and the first end 205*a,*
- means 210 for moving focal point of the ultrasound waves
- means 212 configured to move the transducer and/or means 213) configured to move the housing,
- means 214 configured to select the target based on an image of the sample.
- imaging means 215 for producing the image of the sample,
- means 216 configured to control one or more of: pH of the fluid, temperature of the fluid, velocity of the fluid, water content of a non-aqueous fluid, relative humidity of a gaseous fluid.

According to another aspect the present invention concerns a method for feeding material from a sample to a detecting means using the sampling system described above. The method comprises the following steps:

i) immersing the sample into a fluid, ii) selecting a target on an interface between the sample and the fluid, iii) subjecting the target to focused ultrasound waves wherein intensity of the ultrasound at the target is at least 1 W/cm$^2$, preferably at least 10 W/cm$^2$, thereby removing material from the sample and producing an acoustic stream in the fluid comprising removed material, and iv) feeding at least part of the fluid comprising the removed material to the detecting means.

According to a particular embodiment the method the step iv) comprises feeding at least part of the fluid comprising the removed material to the detecting means.

Particular samples suitable for the method are those which should be preserved and analysed while immersed into a fluid. Exemplary samples are biological samples such as cell cultures, tissue sections, forensic samples, plants, and materials comprising active pharmaceutical ingredients. Further exemplary samples are organic or inorganic solid or semi-solid materials that do not dissolve into the immersion fluid, paints, polymers, gel-like materials, and metals.

According to a particular embodiment the sample comprises material rich in rare and precious metals (RPM), such as gold.

High-intensity focused-ultrasound-induced (HIFU) inertial cavitation can be used to erode surfaces such as surfaces of PCBs. With a MHz transducer, both imaging to determine ROIs and extracting RPMs is possible.

Exemplary immersion fluids are water, buffer solutions such as PBS, and alcohols such as ethanol and methanol, acetonitrile, and their mixtures. Naturally, desalting, or other purification methods may be is needed prior detection.

According to another embodiment the fluid is gas, in particular moist gas.

According to the method a target on the interface sample is subjected to high intensity focused ultrasound. When the sample is solid, the interface is the surface of the sample. The intensity of the ultrasound should be high enough to remove material from the sample.

The distance d between the transducer and the interface is adjusted, if needed by moving the transducer along the +/−y-direction of the coordinate system 199 until the focal point is at the desired position. The energy density of the ultrasound waves should be high enough to remove material from the surface, but low enough to prevent decomposition of the material. Exemplary ultrasonic excitation parameters are piezo voltage amplitude, cycle count in a burst, total amount of bursts and pulse repetition frequency. Exemplary parameters for the method are listed below.

- HIFU intensity at the focal spot is preferably higher than 1 W/cm$^2$, preferably 10 W/cm$^2$ or higher.
- The frequency of the transducer should be at least 20 kHz, preferably at least 1 MHz such as 1 MHz-15 MHz. Even higher frequencies can be used.
- the pressure amplitude at the focus is preferably more than 10 MPa, such as 20-25 MPa.
- The cycle count of the ultrasonic bursts is between 20 and 80 or more.
- Pulse repetition frequency (PRF) is tuned so that the transducer does not overheat. For example, for a water-immersed 12 MHz single-element piezoceramic, maximum of 50 W-100 W of forward electric power is suitable.
- The distance h between the first end (such as the tip of a capillary) and the interface should be at least 1 mm, preferably between 1.5 mm and 5 mm.

According to another embodiment the method comprises imaging the sample prior to the step ii) and selecting the target point based on the image.

MATERIALS AND METHODS

The setup consists of an acoustic excitation part and a liquid handling part. A signal generator (Tektronix AFG31052, UK) was used to generate sinusoidal electric signal, which was amplified with RF power amplifier (Amplifier Research 500A100A, USA). A custom-made transducer (3D-printed) with a concave piezo-electric crystal converted the electric signal into mechanical pressure waves propagating through the immersion bath. The electric signal consists of bursts of a sine wave at f=7.0 MHz and PRF=500 Hz. Ultrasound echoes reflected from the sample surface was recorded with an oscilloscope (Picoscope 5203, UK) using a 100×-probe for aligning (adjusting the focal distance precisely) with low intensity ultrasound excitation amplitude which is suitable e.g., for imaging modality. A coded excitation signal (frequency modulated chirp sine wave, f=6-8 MHz) was used for cross-correlating the emitted electric signal with the acoustic echo signal resulting in a cross-correlogram, from which the time-of-flight (TOF) of the propagation path was acquired. The transducer was moved along the x,y,z-directions by translation stages controlled with manual micro-metre screws. Milli-Q (Merck Millipore, France) purified water was used as immersion fluid.

Fluid Sampling System

Sampling of immersed fluid was performed in a syringe-free manner with a fluid handling pump (VICI® M6, Switzerland). Material for the sampling capillaries was Peek 1/16" (ID of 50 μm). Finger-tight capillary connections (VICI®, Switzerland) were used between the connections. Each sample (sample volume of 200 μl) was withdrawn into a sampling loop before the pump A-channel, which was then emptied into a 500 μl Eppendorf tube by changing the pumping direction and by withdrawing Milli-Q water into the pump's B-channel. The liquid handling pump was controlled by motion control unit (M-Force) from Schneider Electric®. The M-force unit has i/o pins, which were utilized for trigger-functions of programmed (using its own programming language Mcode) pumping actions (infusion and withdrawal at the specific volume rate and volume). When some i/o pin was pulled to ground it triggered the pre-programmed pumping action. The volume rate of sampling was set to 5000 μl/min, which provided good consistency in results of sampling. After each sonicated sample, the sampling capillary line was flushed with 3 ml of MeOH and 3 ml of Milli-Q preventing carry-over effects (solvents are withdrawn through the B-channel into waste).

Chemical Analysis Via Mass Spectrometry

For chemical analysis of the samples Agilent® Ion Trap (6330) with electrospray ionization (ESI) source at positive polarity was used. Samples were introduced by direct infusion using a syringe pump (Harvard apparatus, PHD 2000) at a flow rate of 20 μl/min. Source parameters were as following: dry gas temperature 325° C., nebulizer pressure 15.0 psi and dry gas flow rate 5 l/min. Acquisition parameters of ion optics and trap are displayed in Table T2. Data was captured by averaging five spectra and using a rolling average of two. The m/z-range of acquiring data was set to start from m/z=50 to m/z=1000.

The following chemicals were used methanol (LC-MS Chromasolv®, Honeywell, Germany) and formic acid (98-100% for analysis EMSURE®, Merck KGaA, Germany) in the MS analysis. Marker was Sakura 130, black, Japan. The pre-tests black marker tip was dipped into 100% MeOH and diluted (1/100) into 20%, 40%, 60%, 80% and 100% MeOH (with 0.1% formic acid FA). As the MeOH concentration rises from 20% to 60% higher m/z (especially m/z=530) becomes more abundant, which rises from the improved solubility of the marker molecules to higher solvent content. The higher the MeOH concentration was the higher also becomes the abundance of non-relevant background ion peaks (contaminants e.g., from the ion source and capillaries). Therefore, a suitable solvent for this marker analyses was chosen to be the 60% MeOH+0.1% FA (acid for ionization efficiency).

During the sampling process the sampling capillary wash flushed after each HIFU excitation with three ml of 100% MeOH and three ml of Milli-Q water to prevent contamination of adjacent samples. Also, at least one ml of sampling fluid from the immersion bath was withdrawn through the sampling loop to secure the background stability (sampling loop contains a fully representative liquid background before each sample).

The sampling loop (200 μl) was emptied into a 500 μl Eppendorf tube. Immediately, a solvent plus acid mixture (300 μl, containing 100% MeOH+0.17% FA) was added into the Eppendorf for dissolving captured particles and the cap was closed. Tubes were labelled and stored at refrigerator (−18° C.) until they were analyzed by MS.

Data processing was performed with MATLAB® 2020b after the raw data (x,y) was exported using the Agilent Data Analysis for 6300 series Ion Trap LC/MS version 3.4 software. Generally, m/z spectra display only the raw data without any signal processing, but a simple background subtraction was performed to enhance the peaks arising from the marker for the sample taken during the HIFU excitation, from which the previously sampled (SN, foc. (focused)) mass spectrum was subtracted. If the subtracted signal intensity was negative, it was recorded as zero.

Results

The HIFU Generated Desorption Process

Figure 3:
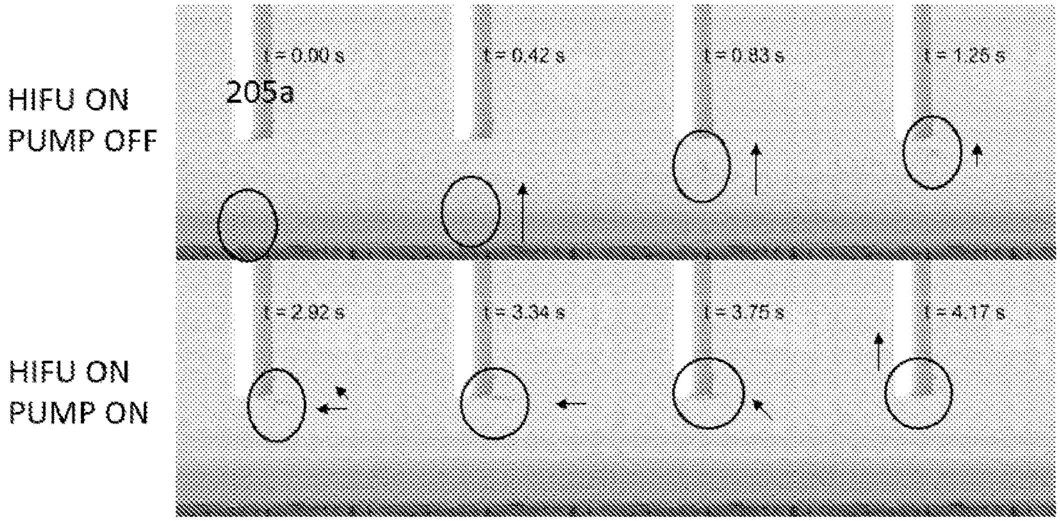
FIG. 3 illustrates snapshots of a process for removing material from a sample according to an exemplary non-limiting embodiment of the present invention.

The HIFU generated desorption process was demonstrated by using a marker ink on top of an aluminium surface. FIG. 3 shows snapshots of a video image acquired during the process as a function of time. The figure shows a particle cloud of black ink rising towards the ultrasound transducer (transducer's focal distance ca 17 mm) after the high-intensity ultrasound is turned on. The HIFU transducer produces an acoustic stream which drags the desorbed particles along the streaming motion for a couple of mms from the surface (FIG. 2, top). When the withdrawal of fluid is applied by the liquid handling pump, the ink particle cloud is withdrawn into the sampling capillary 208 (FIG. 2, bottom). The direction of movement of the adsorbed material is marked in the figure with arrows.

Figure 4:
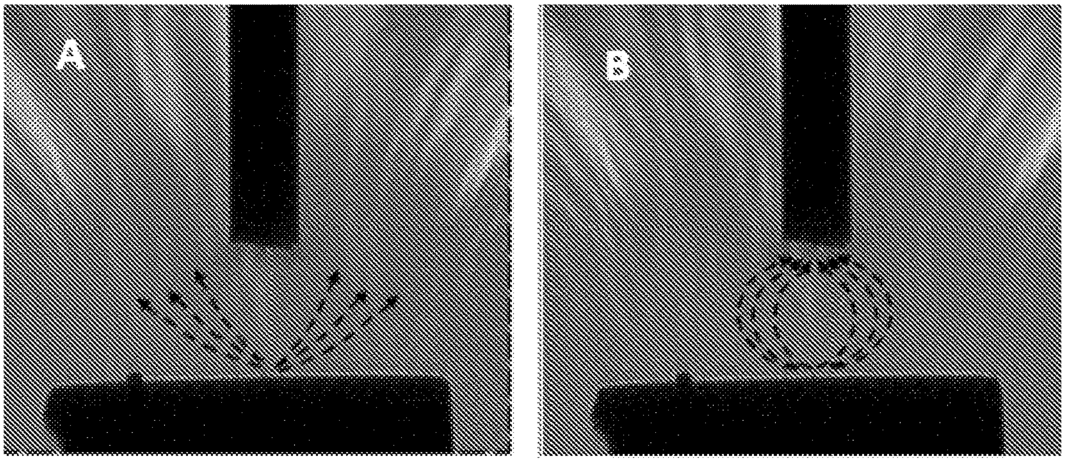
FIG. 4 illustrates frames of a video acquired with a stroboscopic Schlieren imaging setup. A) without suction of liquid into the sampling capillary and B) with suction flow into the capillary. The width of the capillary is 1.58 mm.

FIG. 4 shows frames of a video acquired with a stroboscopic Schlieren imaging setup. Completely black areas (cross sections of sampling capillary and the sample) correspond to optically opaque media and lighter pattern-areas depict backscattered pressure waves from the surface. The drawn dashed lines illustrate the streamlines of detached material under the HIFU field targeted on the solid surface A) without suction of liquid into the sampling capillary and B) with suction flow into the capillary. Notice that the combined effect of acoustic streaming and suction flow into the capillary in B) show changes to the streaming field in comparison to A). A noticeable increase in motion of ablating material towards the capillary is visible in the video footage.

Chemical Analysis of Ultrasound Desorbed Surface Material

Chemical analysis of ultrasound desorbed surface material was performed by mass spectrometry using electrospray ionization. Liquid samples taken during and after HIFU excitation were analysed. Several adjacent samples were taken within the same samples and the abundance of two m/z peaks (530, 439) corresponding to a marker (Sakura 130) were determined.

Figure 5:
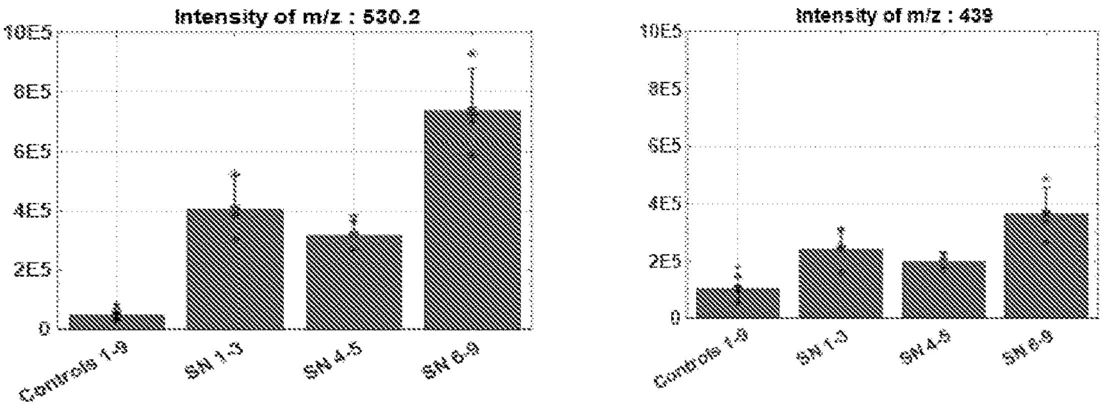
FIG. 5 illustrates relevant m/z-peaks and abundances of a marker-related ions of several adjacent HIFU-excitations on a sample surface (spot spacing 1 mm). First three sonication spots (SN 1-3) were performed at slightly lower intensity, then from the next two samples (SN 4-5) with higher intensity, and for the last four samples (SN 6-9) the sampling capillary was translated 2 mm closer to the sample surface.

The abundance levels of the two marker ions are presented in FIG. 5. During the 3 W (electric power) excitation, the two most relevant peaks (530, 439) showed ca 4 times higher m/z peak height (S/N=4) than the background sample. When the excitation power was increased to 4 W and the distance h of the tip of the sampling capillary from the interface was decreased, the m/z peak abundance was almost doubled.

Removal of Sharpie Fine Point Permanent Marker from a Sample Surface

Sharpie fine point marker (colour back or blue) was applied on top of a microscopy cover slide. The marked was allowed to dry and the slide was immersed into a water bath. A plurality of spots (spacing 1 mm) were removed by focusing HIFU to the slide surface using different US intensities. The distance h between the sample surface (here: interface between the sample and the fluid) and sampling capillary was adjusted to 2 mm. The samples were withdrawn (aspiration of pump) with 5 ml/min during the HIFU excitation. Sample volume was 200 μL. Samples were infused from the sampling capillary into an Eppendorf tube, diluted with HPLC/MS solvent ($CH_3CN$:$H_2O$; 1:1 (v/v)+ 0.1% by vol formic acid) and analysed by mass spectrometry.

Figure 6:
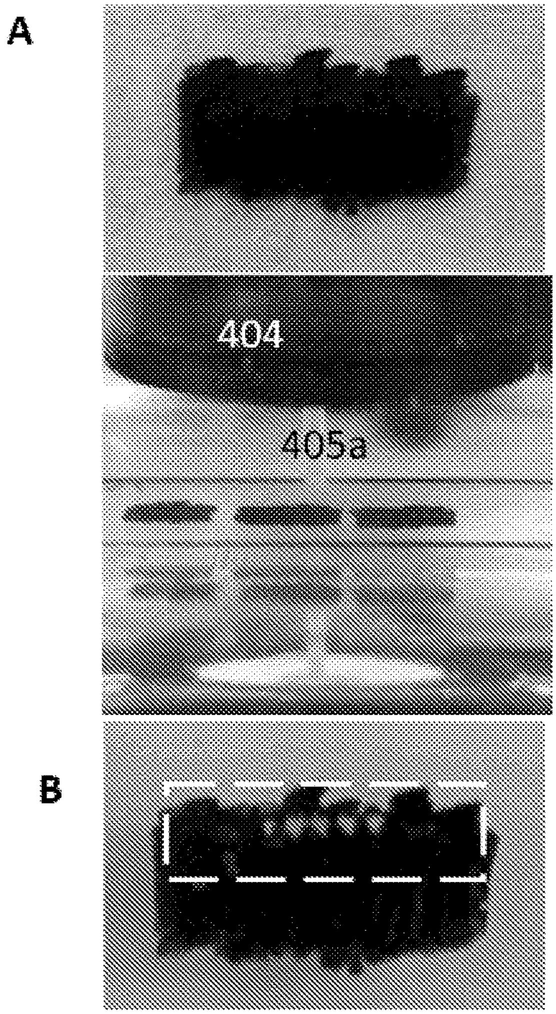
FIG. 6 illustrates an image of an exemplary sample before (A) and after (B) sampling using system of the present invention.

FIG. 6 shows a marker surface before (A) and after (B) subjecting the surface to HIFU. The sample was immersed in a water-bath. The ultrasound transducer and the sampling capillary is shown in the figure (middle) with reference numbers 404 and 408, respectively. As shown in the figure (B), the HIFU removed five distinct areas of marker ink from the surface.

Figure 7:
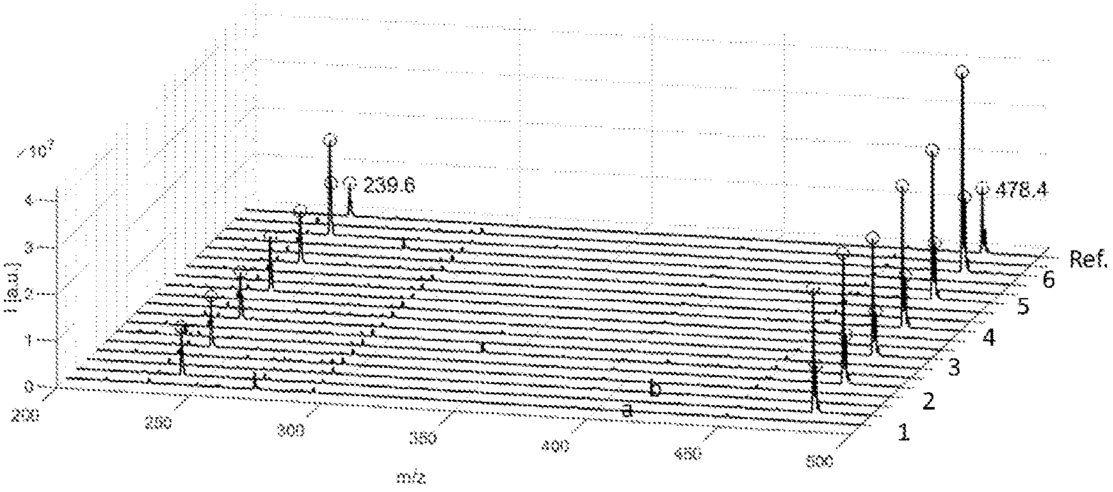
FIG. 7 illustrates exemplary MS analysis of material removed from a target on a sample using the method of the present invention. Vpp 900 mV; Spots 1-3 RF gain=60%; spots 4-6: RF gain=50%.

FIG. 7 shows the MS analysis of materials extracted from six predetermined positions (1-6) of sample surface using the method of the present invention and a reference (ref; Sharpie fine point marker dissolved in water). As shown, material from each position of the surface was successfully extracted and analysed. The material could not be extracted when the transducer was turned off as evidenced by the dummy mass spectra before and after each excitation, two of which marked in the figure by letters a and b.

Figure 8:
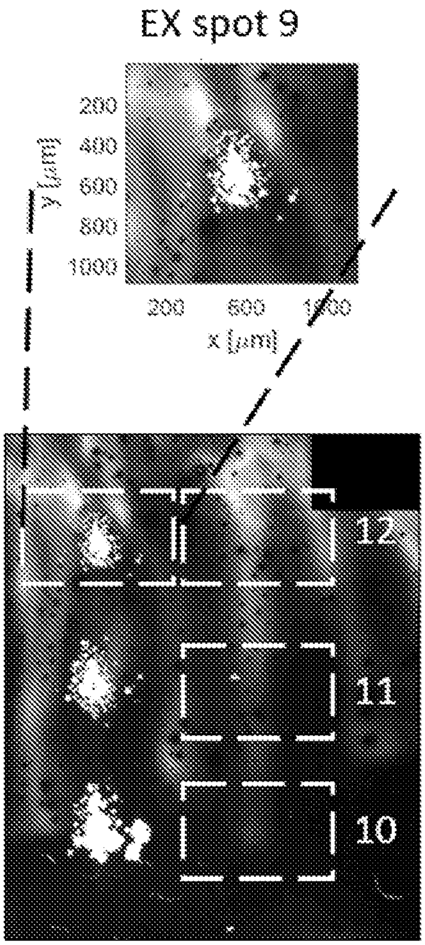
FIG. 8 illustrates the effect of the ultrasound intensity on an exemplary sample. Vpp=900 mV; spot 9: RF gain 50%; spots 10-12 RF gain=30%.

FIG. 8 demonstrates the effect of the ultrasound intensity on sample extraction. When the ultrasound intensity was below cavitation threshold (spots 10-12) the sample could not be extracted from the sample surface. Analogously, when the ultrasound intensity was above the cavitation threshold the sample was successfully extracted (spot 9).

The specific examples provided in the description above should not be construed as limiting the scope and/or the applicability of the appended claims.

What is claimed is:

1. A system for sampling material to a detecting means, the system comprising

- a housing for
  - a sample and
  - a fluid for immersing the sample,
- a transducer configured to emit focused ultrasound waves towards a target on interface between the sample and the fluid for removing material from the sample to the fluid and for producing an acoustic stream in the fluid, and
- a feeding means comprising a first end configured to be positioned between the transducer and the interface, and a second end configured to be connected to the detecting means, and fluid transport means between the first end and the second end, the feeding means configured to transport at least part of removed material to the detecting means.

2. The system according to claim 1, wherein intensity of the ultrasound at the target is at least 1 W/$cm^2$.

3. The system according to claim 1 wherein frequency of the ultrasound is at least 20 kHz.

4. The system according to claim 1, comprising means for adjusting distance h between the interface and the first end.

5. The system according to claim 1, comprising means for moving focal point of the ultrasound waves.

6. The system according to claim 1, comprising means configured to move the transducer and/or means configured to move the housing.

7. The system according to claim 1, comprising means configured to select the target based on an image of the sample.

8. The system according to claim 7, comprising imaging means for producing the image of the sample.

9. The system according to claim 1, comprising means configured to control one or more of: pH of the fluid, temperature of the fluid, velocity of the fluid, water content of a non-aqueous fluid, relative humidity of a gaseous fluid.

10. The system according claim 1, comprising means for collecting at least part of the removed material.

11. A detecting means comprising a system according to claim 1.

12. The detecting means according to claim 11 selected from one or more of: a mass spectrometer, Raman spectrometer, NMR spectrometer, IR spectrometer, UV spectrophotometer, scanning electron microscope, atomic force microscope, quartz crystal balance, dynamic light scattering meter, high pressure liquid chromatograph, x-ray diffractometer, activity assay means, immunoassay means, and Raman spectrometer.

13. The detecting means according to claim 11 wherein the detecting means is electrospray ionization mass spectrometer.

14. A method of feeding material from a sample to a detecting means using a system as defined in claim 1, the method comprising i) immersing the sample into a fluid, ii) selecting a target on an interface between the sample and the fluid, iii) subjecting the target to focused ultrasound waves wherein intensity of the ultrasound at the target is at least 1 W/$cm^2$, thereby removing material from the sample and producing an acoustic stream in the fluid comprising removed material, and iv) feeding at least part of the fluid comprising the removed material to the detecting means.

15. The method according to claim 14 wherein step iv) comprises at least part of the fluid comprising the removed material to the collecting means.

16. The method according to claim 14 wherein frequency of the ultrasound is at least 20 kHz.

17. The method according to claim 14, wherein the system comprises means for adjusting distance h between the interface and the first end, the method comprising adjusting the distance to at least 1 mm.

18. The method according to claim 14, comprising imaging the sample prior to step ii) and selecting the target based on the imaging.

* * * * *